3,775,362
PROCESS FOR THE PRODUCTION OF
PIGMENTED POLYAMIDES
Bert Brassat, Krefeld-Bockum, Germany, assignor to
Bayer Aktiengesellschaft, Leverkusen, Germany
No Drawing. Filed Feb. 17, 1972, Ser. No. 227,253
Claims priority, application Germany, Feb. 17, 1971,
P 21 07 485.1
Int. Cl. C08g 51/04
U.S. Cl. 260—37 N                12 Claims

ABSTRACT OF THE DISCLOSURE

An improved process for the production of pigmented polyamides obtained by activated anionic polymerisation of a mixture comprising a lactam having at least 6 ring members, an activator and alkaline catalyst in the presence of pigments, the improvement comprising adding an aluminium alcoholate to said mixture.

---

The present invention relates to a process for the production of pigmented polyamides by the activated anionic polymerisation of lactams in the presence of pigments.

It is known that polyamide granulates for injection-moulding and extrusion purposes are generally marketed in pigmented form. To pigment also polyamides obtained by activated anionical polymerisation is a great problem. In many instances, pigmentation is possible by adding a pigment in finely divided form to a polymerisable lactam mixture before polymerisation is carried out. Unfortunately, numerous pigments cannot be employed in this procedure because the activated anionic polymerisation reaction only proceeds poorly or, in some instances, does not proceed at all in their presence. This limitation causes prolonged polymerisation times and incomplete polymerisation, which in turn leads to an increased monomer content in the polymer. The reason for this inhibiting effect of the pigments is not clear in every instance, but it can be reduced when the pigment is heated for several hours at 200° C. in vacuo before it is added or by treating the pigment with an acylating agent. This treatment can be avoided by using an isocyanate as activator for the anionic polymerisation reaction. If this isocyanate is used in excess, it also acts as an acylating agent and, in doing so, reacts with OH-groups attached to the surface of the pigment, in accordance with the following equation:

pigment—OH + O=C=N—R

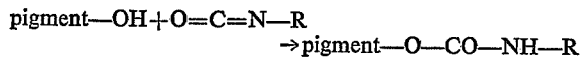

or with adsorbed water in accordance with the equation $$H_2O + 2R—N=C=O \rightarrow R—NH—CO—NH—R + CO_2$$

with higher water contents, however, the carbon dioxide formed becomes noticeable in the form of troublesome gas bubbles. Even in the absence of water, gas bubbles can occur when the concentration of isocyanate is considerably higher than that required for activating the polymerisation reaction, because the isocyanate gives off carbon dioxide under the influence of the basic catalyst at elevated temperature, and is converted into a carbodiimide:

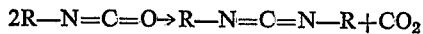

Thus, it is only possible to obtain a small improvement in the outcome of the polymerisation reaction by increasing the amount of activator.

Additives which effect an easier incorporation of inorganic micro-particles during the anionic polymerisation of lactams, are known from a number of patent applications. They are effective both for the incorporation of fillers and for the actual pigmenting process. The additives in question are silicon compounds containing reactive groups such as isocyanate, epoxy, amino groups (cf. German Offenlegunsschrift No. 1,520,392, Belgian patent specification No. 703,759, and Dutch patent specification No. 6712592). Unfortunately, these substances are difficult to produce and hence are expensive. Thus, one of the main advantages of anionic polymerisation, namely the reduction in costs attributable to the simplicity of the process, is partly offset.

In some instances, the polymerisation mechanism can be improved by the addition of wetting agents (see German Offenlegungsschrift No. 1,520,565, and British patent specification No. 1,065,522), whereby this effect is based, however, on the better distribution of pigment.

It has now surprisingly been found that the anionic polymerisation of lactams having at least 6 ring members in the presence of pigments can be distinctly improved by adding a small quantity of an aluminium alcoholate to the pigment-containing polymerisable mixture. This is all the more surprising insofar as, although aluminium alcoholates are known to react with acidic OH-groups and with water, this reaction results in the formation of free alcohols, which in turn inhibit the anionic polymerisation reaction. Thus it is sufficient to add 0.1% by weight of isopropanol to a polymerisable mixture of caprolactam, catalyst and activator to prolong the polymerisation time by one third and considerably to increase the extractable residual monomer content of the polymer. On contrast by addition of aluminium isopropylate the polymerisation time is shortened and the monomer content is reduced. Another observation even indicates, in some instances, that the extractable monomer contents which can be obtained by adding aluminium alcoholates are even lower than the theoretical values corresponding to the state of equilibrium between the polymer and monomer at the particular polymerisation temperature. The reasons for this are not known.

Another surprising factor is that, by adding aluminium alcoholates during the activated anionic polymerisation of lactams in the presence of pigments, it is possible to obtain a considerably improved distribution of pigment, so that the addition of wetting agents can be reduced, or even dispensed at all.

Accordingly the present invention relates to an improved process for the production of pigmented polyamides obtained by activated anionic polymerisation of a mixture comprising a lactam having at least 6 ring members, an activator and alkaline catalyst in the presence of pigments, the improvement comprising adding an aluminium alcoholate to said mixture.

Aluminium alcoholates suitable for the invention include the aluminium alcoholates derived from aliphatic or araliphatic mono- or polyalcohols. Particularly suitable for addition to a polymerisable pigment-containing mixture are aluminium alcoholates of alcohols having preferably 2 to 10, most preferably 2 to 4 carbon atoms, such as aluminium methoxide, aluminium ethoxide, aluminium n-propoxide, aluminium isopropoxide, aluminium n-butoxide, aluminium sec-butoxide, aluminium t-butoxide, aluminium isobutoxide, aluminium amylate, aluminium octadecane diolate and aluminium benzylate.

The aluminium alcoholates are preferably added before the polymerisation in quantities of from 1 to 100%, most preferably 3 to 50% by weight, based on the pigment.

Oxidic, silicate-containing or sulphate-containing pigments are preferably added to the polymerisable mixtures.

Lactams having at least 6 ring members are suitable such $\beta$-pyrrolidone, $\epsilon$-caprolactam, oenanthic lactam, caprylic lactam, lauric lactam, the corresponding C-substituted lactams or mixtures thereof.

The catalysts known in the art for the anionic polymerisation can be used, especially alkali metal and alkaline earth metal compounds from lactams such as sodium-$\epsilon$- caprolactam, from aliphatic carbon acids such as sodium, potassium formate, from alcohols such as sodium-methylate, potassium-butylate or sodium-phenolate and alkali metal and alkaline earth metal hydrides, oxides and carbonates.

The activators known in the art can be used for the polymerisation such as isocyanates, especially hexamethylene-diisocyanate, phenylisocyanate, masked isocyanates especially hexamethylene - 1,6 - bis-(carbamide-caprolactam), carbodiimides, carbonimides or triazines.

The invention is as useful for the discontinuous production of pigmented polyamides as for the continuous production.

EXAMPLE 1

A 250 ml.-capacity glass flask contains a powdered mixture of 110 g. of caprolactam, 0.6 g. of sodium caprolactamate, 1 g. of the addition product of hexamethylene diisocyanate and caprolactam and 1.2 g. of the various pigments. In the cases which are identified in Table 1, 0.24 g. of aluminum isopropoxide is also added. The flask is evacuated twice to 10 torr and on each occasion is filled with nitrogen. Thereafter, it is lowered with stirring into an oil bath kept at 210° C. The mixture initially melts and then polymerises. In the following table, the period of time elapsing from immersion to the point at which the mixture becomes unstirrable is referred to as the induction time. It is a measure for the polymerisation velocity.

TABLE 1

| Pigment | Without Al-isopropoxide | | With Al-isopropoxide | |
| --- | --- | --- | --- | --- |
| | Induction time | Extract content, percent by weight | Induction time | Extract content, percent by weight |
| Without pigment | 5 min., 39 sec. | 7.9 | | |
| Rutil KB [1] | 10 min., 40 sec. | 9.9 | 5 min., 6 sec. | 8.2 |
| Ultramarin 2862 [2] | 13 min. | 18.0 | 6 min., 45 sec. | 6.8 |
| Ultramarin 3269 [2] | No polymerisation | | 10 min. | 20.6 |
| Iron oxide [1] yellow | No polymerisation | | do. | 18.2 |
| BaSO₄ (precipitated) | 7 min., 30 sec. | 7.7 | 6 min. | 6.9 |

[1] Manufacturer: Farbenfabriken Bayer AG.
[2] Manufacturer: Vereinigte Ultramarin-Fabriken-Marienburg b. Bensheim.

In every instance, when aluminum isopropylate is added distribution of the pigment is better than it is in the absence of this addition.

EXAMPLE 2

A 250 ml.-capacity glass flask equipped with a gas-inlet pipe, an internal thermometer and stirring mechanism contains a powdered mixture of:

110 g. of caprolactam
0.5 g. of sodium lactamate
1.0 g. of the addition product of hexamethylene diisocyanate and caprolactam
0.6 g. of N-benzyl acetamide (as molecular weight regulator)
1.5 g. of Rutil KB (a product of Farbenfabriken Bayer AG) and
0.3 g. of the various aluminium alcoholates mentioned in Table 2.

Nitrogen is passed over the powder for a period of one minute, after which the flask is lowered with stirring into an oil bath kept at 220° C. while more nitrogen is passed over. The mass initially melts and then polymerises. The period of time elapsing from the point at which an internal temperature of 100° C. is exceeded to the point at which the mixture becomes unstirrable, is measured. It is a measure of the reaction velocity and is referred in the following table as the polymerisation time.

TABLE 2

| Aluminium alcoholate added | Polymerisation time | Extract content of the polymer, percent by weight | Relative viscosity of the polymer [1] |
| --- | --- | --- | --- |
| No addition | 7 min., 30 sec. | 12.6 | 2.8 |
| Isopropoxide | 4 min. | 9.8 | 3.2 |
| t-Butoxide | do. | 9.9 | 3.1 |
| Sec-butoxide | do. | 9.3 | 3.4 |
| Ethoxide | 6 min. | 10.5 | 3.0 |

[1] As measured in m-cresol, c=1 g./100 ml.

EXAMPLE 3

A double-shaft extruder with a screw diameter of 43 mm. and a length of 30D is used as polymerisation apparatus. It comprises five zones heated independently of one another. The feed zone remains unheated, whilst the remaining heating zones have the following temperatures:

180—230—230—230° C.

Extrusion takes place through an extrusion nozzle heated at 250° C. The resulting strand is cooled in water and granulated. The polymerisable mixture consists of:

1100 parts of caprolactam
18 parts by weight of the adduct of hexamethylene diisocyanate and caprolactam
8 parts by weight of sodium lactamate
8 parts by weight of N-benzyl acetamide
10 parts by weight of Rutil KB (a product of Farbenfabriken Bayer AG) and
2 parts by weight of aluminium isopropoxide Extrusion gives a polymer with an extract content of 10.3% by weight and a relative viscosity of 2.55 (measured as in Example 2).

Repetition of the test without any aluminium isopropoxide gives a product with an extract content of 17.5% by weight and a relative viscosity of 2.05.

EXAMPLE 4

Polymerization is carried out in a screw injection-moulding apparatus with a three-zone screw 88 mm. in diameter and 12D in length. It comprises three heating zones which are respectively heated to 230° C., 230° C. and 250° C. A rectangular panel mould kept at room temperature is used as the mould. The injection-mouldings measure 70 x 55 x 5 mm. A hydraulic ram extruder is flanged onto the feed opening, its ram being designed to be moved up and down hydraulically. With the ram in its elevated position, the solid polymerisable mixture can be introduced into the extruder through a laterally arranged hopper. The lower part of the extruder barrel is electrically heated to 90° C. When the ram is lowered, the lactam mixture beneath it is initially compressed, partly fuses on the hot wall of the barrel and is extruded into the feed opening of the injection-moulding apparatus before it is able to form a solid plug. The apparatus is fed with a polymerisable mixture having the following composition:

1100 parts by weight of caprolactam,
12 parts by weight of the adduct of hexamethylene diisocyanate and caprolactam,
6 parts by weight of sodium caprolactamate,
6 parts by weight of N-benzyl acetamide,
15 parts by weight of Rutil KB (a product of Farbenfabriken Bayer AG), and
2 parts by weight of aluminium isobutoxide.

After the mixture has been fed in, it polymerises for 90 seconds and is then injected into the mould. The completed injection moulding can be removed after another 30 seconds. It has a monomer extract content of 10.9% by weight. An extract content of 18.6% by weight is obtained in the absence of aluminium isobutoxide.

EXAMPLE 5

The following mixture is accommodated in the polymerisation vessel described in Example 2:

170 g. of lauric lactam,
0.5 g. of sodium caprolactamate,
1.0 g. of the addition product of hexamethylene diisocyanate and caprolactam, and
2.0 g. of Ultramarin 3269 (a product of Vereinigte Ultramarin-Fabriken).

The oil bath temperature is 180° C. The polymerisation time, measured as in Example 2, is 9 minutes 30 seconds. Repetition of the test following the addition of 0.5 g. of aluminium sec-butoxide gives a polymerisation time of 4 minutes 45 seconds.

I claim:

1. In an improved process for the production of pigmented polyamides obtained by activated anionic polymerization of a mixture comprising a lactam having at least 6 ring members, an activator and an alkali metal or alkaline metal lactamate catalyst in the presence of a pigment selected from the group consisting of oxidic, silicate-containing and sulfate-containing pigments, the improvement which comprises adding an aluminium alcoholate to said mixture.
2. A process as claimed in claim 1, wherein an aluminium alcoholate derived from an aliphatic or araliphatic mono- or polyalcohol is added.
3. A process as claimed in claim 1, wherein an aluminium alcoholate of an alcohol having 2 to 10 carbon atoms is added.
4. A process as claimed in claim 1, wherein one of aluminium methoxide, aluminium ethoxide, aluminium n-propoxide, aluminium isopropoxide, aluminium n-butoxide, aluminium sec-butoxide, aluminium t-butoxide, aluminium isobutoxide, aluminium amylate, aluminium octadecane diolate or aluminium benzylate is added as the alcoholate.
5. A process as claimed in claim 1, wherein 1 to 100% by weight of the aluminium alcoholate, based on the pigment, is added.
6. A process as claimed in claim 1, wherein 3 to 50% by weight of the aluminium alcoholate, based on the pigment is added.
7. A process as claimed in claim 1, wherein the lactam is β-pyrrolidone.
8. The process of claim 1 in which the lactam is ε-caprolactam.
9. The process of claim 1 in which the lactam is lauric lactam.
10. The process of claim 1 in which the lactam is oenanthic lactam.
11. The process of claim 1 in which the lactam is caprylic lactam.
12. The process of claim 1 in which a mixture of lactams having at least 6 ring members is polymerized.

References Cited
UNITED STATES PATENTS

| | | | |
|---|---|---|---|
| 3,451,963 | 6/1969 | Tierney | 260—78 L |
| 3,450,662 | 6/1969 | Tierney | 260—78 L |
| 3,216,976 | 11/1965 | Schwartz | 260—78 L |
| 3,639,359 | 2/1972 | Garritsen | 260—78 L |
| 3,631,223 | 12/1971 | Matzner | 260—78 L |

ALLAN LIEBERMAN, Primary Examiner

P. R. MICHL, Assistant Examiner

U.S. Cl. X.R.

260—78 L